US010454568B2

(12) United States Patent
Prillard et al.

(10) Patent No.: US 10,454,568 B2
(45) Date of Patent: Oct. 22, 2019

(54) METHOD AND SYSTEM FOR 4D-TDMA MULTI-USER TRANSMISSION (71) Applicant: THALES, Courbevoie (FR)

(72) Inventors: Bertrand Prillard, Gennevilliers (FR); Marc Touret, Gennevilliers (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/548,388

(22) PCT Filed: Mar. 1, 2016

(86) PCT No.: PCT/EP2016/054318
§ 371 (c)(1),
(2) Date: Aug. 2, 2017

(87) PCT Pub. No.: WO2016/139202
PCT Pub. Date: Sep. 9, 2016

(65) Prior Publication Data
US 2018/0041268 A1 Feb. 8, 2018

(30) Foreign Application Priority Data
Mar. 2, 2015 (FR) ...................................... 15 00397

(51) Int. Cl.
H04B 7/185 (2006.01)
H04B 7/212 (2006.01)
H04W 72/04 (2009.01)

(52) U.S. Cl.
CPC ........... H04B 7/1858 (2013.01); H04B 7/212 (2013.01); H04B 7/2123 (2013.01); H04B 7/2125 (2013.01); H04W 72/0446 (2013.01)

(58) Field of Classification Search
None
See application file for complete search history.

(56) References Cited

U.S. PATENT DOCUMENTS 5,274,626 A * 12/1993 Hotta .................... H04B 7/2123
370/296
5,850,395 A * 12/1998 Hauser .............. G06F 15/17375
370/398

(Continued)

FOREIGN PATENT DOCUMENTS

EP 2 360 855 A1 8/2011

OTHER PUBLICATIONS

P. Clark et al., "QoS-based provisioning of ATM services over DAMA-controlled SATCOM networks," IEEE Military Communications Conference Proceedings, vol. 2, Oct. 31, 1999, pp. 1358-1362, XP010369831.

Primary Examiner — Faruk Hamza
Assistant Examiner — Cassandra L Decker
(74) Attorney, Agent, or Firm — Baker & Hostetler LLP (57) ABSTRACT A method and a system for multi-user transmission in a network, comprising at least on network control center NCC and one or more terminals, wherein the method comprises at least the following steps: determining the number of 4D-TDMA carriers as a function of the number and needs of the terminals, determining the type (SCPC or TDMA) and frequency band Bi of each of the 4D-TDMA carriers as a function of the terminals transmitting on the carriers, for each frame, dividing the band B into PTDMA transmission channels and into PSCPC service channels, each channel consisting of frames comprising a plurality of slots, STDMA slots and SSCPC slots, dynamically allocating a plurality of slots of a 4D-TDMA carrier according to the services required by each terminal, configuring the coding and modulation scheme of each slot by taking account of the quality of the received signals.

10 Claims, 6 Drawing Sheets (56) References Cited

U.S. PATENT DOCUMENTS

| | | | | |
|---|---|---|---|---|
| 6,047,015 A | * | 4/2000 | Watanabe | H04B 1/692 |
| | | | | 375/132 |
| 6,240,073 B1 | * | 5/2001 | Reichman | H04B 7/1858 |
| | | | | 370/319 |
| 7,359,344 B1 | | 4/2008 | Cheng et al. | |
| 8,068,448 B1 | * | 11/2011 | Foley | H04B 7/18515 |
| | | | | 370/316 |
| 2008/0014951 A1 | * | 1/2008 | Laroia | H04W 72/042 |
| | | | | 455/450 |
| 2009/0180431 A1 | * | 7/2009 | Sengupta | H04W 72/085 |
| | | | | 370/329 |

\* cited by examiner

METHOD AND SYSTEM FOR 4D-TDMA MULTI-USER TRANSMISSION

CROSS-REFERENCE TO RELATED APPLICATIONS

This application is a National Stage of International patent application PCT/EP2016/054318, filed on Mar. 1, 2016, which claims priority to foreign French patent application No. FR 1500397, filed on Mar. 2, 2015, the disclosures of which are incorporated by reference in their entirety.

FIELD OF THE INVENTION

The invention relates to a method and a system for 4D-TDMA multiuser transmission. It lies for example in the field of satellite transmissions. It is implemented so as to offer, in particular, very low bitrate services allowing the transmission of Periodical Information Messages known by the abbreviation "PIM".'

BACKGROUND

With the arrival of new-generation satellites, the Satcom satellite communications means operating in the X/Ka bands ought to be generalized to miniaturized terminals. With this in mind, it is therefore necessary to be able to provide services of GSM (Global System For Mobile communication) type i.e., for example, voice services, short message exchanges (SMS), file transfers or BFT service, to these very lightweight and mobile stations known by the expression "Ultra Light On The Move".

A Satcom network must serve numerous terminals, generally at least a hundred. These terminals can be fixed terminals, stations with variable capabilities, mobile terminals known by the abbreviation OTM ("On The Move"), comprising small antennas and a minimum need for connectedness, OTP ("On The Pause") terminals with a significant bitrate need for carrying out data repatriation operations, for example. A Satcom terminal can have very variable needs in terms of bitrate: a few 100 bits/s for "BFT" file transfers, a few kbits/s for Voice over IP or VoIP, a few kbits/s for a communication node, a few 100 kbits/s for data and video. These requirements pose certain technical problems. In the case of large bitrates, very low bitrate carriers are not compatible with OTM applications. When there is a need to send short messages regularly, of SMS or BFT type, the services request few resources, but periodically. Other applications demand a certain flexibility in the use of the resources, adaptation of the carriers (numbers, frequencies, coding, modulation) as a function of the number of terminals and of the services requested (BFT/SMS, VoIP, Data/Video). For all systems, a need to resist interference also exists, especially when dealing with small terminals.

The state of the art describes various systems. It is known to propose BFT file transfer and SMS transmission services, but only in the L band, nothing exists in the X/Ku/Ka band and the problem of data protection is not raised. This solution is not appropriate for a wider communication system. In the X/Ku/Ka bands several solutions exist, but they offer neither protection, nor flexibility in the use of the spatial resources. The DVB-RCS (Digital Video Broadcasting-Return Channel System) waveforms in MultiFrequency Time Division Multiple Access ("MF-TDMA") mode and in Single Channel Per Carrier SCPC (DVB-S2) support mode are different in terms of coding/modulation; their implementation in general requires two different modems. In the case of the SCPC/MF-TDMA hybrid mode, the transition from one mode to the other therefore requires a rebooting of the modem, thereby engendering a loss of transmission and of service for 1 to 2 mins, for example.

The conventional MF-TDMA systems require complex planning involving a large number of parameters such as the number of stations, their bitrates, their availability. This planning is in general sub-optimal and this is all the truer for networks whose number of stations and whose IP Internet needs are very variable over time. The number of carriers must be adapted to the number of stations in operation. If too large a number of carriers are defined, then they will be under-used when there are few stations, and conversely, if there are few carriers, they will be sub-optimal in relation to the IP Internet needs and the propagation conditions of a large number of stations. Moreover, these systems offer only limited protection since they do not offer any means of securing the communications, for example they do not use the mechanism of frequency evasion.

The existing prior art solutions known to the applicant do not offer any medium bitrate/high bitrate continuity of services, do not allow flexibility in the use of the resources, do not cover the very low bitrates and do not offer the possibility of protecting the data during communications.

The following abbreviations will be used in the subsequent description:

ACM: Adaptive Coding and Modulation, technique which consists in dynamically adapting the coding rate and the order of the modulation used as a function of the quality of the received signal, PIM: message equivalent to an SMS (Short Message System) short message, TDMA: Time Division Multiple Access, SCPC: Single Channel Per Carrier.

The term "station" or "terminal" refers to one and the same device.

SUMMARY OF THE INVENTION

One of the objectives of the present invention is notably to offer a service of Satcom secure GSM type for terminals equipped with means of satellite communication in the X/Ka bands, in a 4D-TDMA system.

The invention relates to a method of multiuser transmission in a network comprising at least one central control station NCC and one or more terminals, using a transmission band B, P transmission channels in the transmission band B, characterized in that it comprises at least the following steps:

determining the number of 4D-TDMA carriers as a function of the number and of the needs of the terminals, determining the type (TDMA or SCPC) and the frequency band Bi of each of the 4D-TDMA carriers as a function of the terminals transmitting on these carriers, for each frame, by sharing the transmission band B among $P_{TDMA}$ multi-user transmission channels and among $P_{SCPC}$ single-user transmission channels, each channel consisting of frames $T_n$ comprising several slots, respectively $S_{TDMA}$ slots, $S_{SCPC}$ slots, each frame $T_n$ having a frame duration $T_{Frame}$, which is independent of the channel type, the adaptation of the number of channels being carried out at the frame rate $T_{Frame}$, allocating in a dynamic manner several slots of a 4D-TDMA carrier as a function of the services requested by each terminal, configuring the coding/modulation scheme for each slot while taking account of the quality of the signals received.

According to a variant embodiment, a TDMA or SCPC transmission channel is sent on a carrier in a frequency band Bi while verifying that the sum of the bands ΣBi used is less than the transmission bandwidth B, a channel consists of several frames $T_n$ each having a frame duration $T_{frame}$, which is independent of the channel type, the adaptation of the number of channels being carried out at the frame rate $T_{Frame}$, the carrier and the type of time slices being defined as a function of the service or services requested by the terminals.

In the case where a terminal needs a minimum service the method can release the band allocated to its channel and distribute this band to the other channels of SCPC single-user and TDMA time division multiplexing type.

In the case of synchronous carriers, an orthogonal frequency hop law, for example, is used, the channels changing in a synchronous manner the central frequency of their carrier.

For an application where the period time of the TDMA carriers is equal to the period time of the SCPC carriers, the frequency hop is, for example, executed in a single stage, using a single timing rate.

When the period time of the TDMA carriers is different from the period time of the SCPC carriers, the frequency hop can be carried out in two stages:
  A first frequency hop of the periods of one and the same channel type at the period rate,
  A frequency hop of the bands allocated to the SCPC channels and TDMA channels at the time slice rate.

According to a variant embodiment, the implementation of the method can comprise several Voice over IP VoIP constant bitrate CBR service channels, several variable bitrate VBR service channels for transmission of files or data, and the unallocated VoIP slots are tagged as "data" for the duration of a frame, the unused VoIP slots are put back into a set of "best effort" resources, the slots dedicated to the data are distributed to the terminals according to an algorithm of Round Robin type known to the person skilled in the art.

According to a variant implementation of the method, the central control station indicates to the set of terminals:
  The TDMA Channels
  The Number of carriers
  For each carrier
    The Band allocated to the carrier
    For each slot of each carrier
      The slot Type
        CBR VoIP
        CBR Video
        VBR
        Silence→this type of slot is used for ½ duplex applications for example
      The coding and modulation Scheme (ModCod) for each slot, other than the silence slot
      The sender terminal for the slot
  The SCPC Channels
  The Number of carriers
  For each carrier
    The Band allocated to the carrier
    The Sender Station of the carrier
    The coding and modulation Scheme (ModCod) for each slot
      As a function of the band and of the ModCod scheme, the binary bitrate is deduced therefrom Each station indicates to the NCC
  The services requested
  VBR Channel
    The Bitrate to be transmitted, periodic bitrate of BFT type or FTP bitrate
  CBR Channel
    VoIP
  CBR Channel
    Video
  The quality of the reception of the slots that it receives (C/No).

The invention also relates to a 4D-TDMA multiuser transmission system characterized in that it comprises at least one controller device in conjunction with several terminals, the said controller being adapted to execute the steps of the method exhibiting the characteristics of the invention.

The station NCC and the user terminals may or may not be of half-duplex type.

BRIEF DESCRIPTION OF THE DRAWINGS

Other characteristics and advantages of the present invention will be better apparent on reading the description which follows given by way of wholly nonlimiting illustration, accompanied by the figures which represent:

FIG. 1, a system architecture allowing the implementation of the method according to the invention, FIG. 2, an exemplary time/frequency structure of three channels, FIG. 3, an exemplary adaptation of modulation and coding for TDMA and SCPC channels, FIG. 4, an illustration of the mechanism for reallocating the band allocated to each of the TDMA or SCPC channels, FIG. 5, an illustration of the mechanism for adapting the number of TDMA or SCPC channels, FIG. 6, an illustration of orthogonal frequency hop of the SCPC and TDMA channels, FIG. 7, an illustration of orthogonal frequency hop in respect of three TDMA channels, one SCP channel, FIG. 8, an exemplary distribution of the time slots according to services pathway or data, and FIG. 9, an illustration of the application to a half-duplex terminal.

DETAILED DESCRIPTION

One of the objectives of the present invention is to offer a 4D-TDMA system and a method of multiuser transmission notably offering the following functionalities: protection of the data transmission; optimization of the frequency band used so as to transmit the most possible bits per Hz for the whole of the transmission band; flexibility in the allocation of resources; possibility of satisfying a maximum of users while reducing the risks of contention whilst guaranteeing defined services (VoIP, for example).

Figure 1:
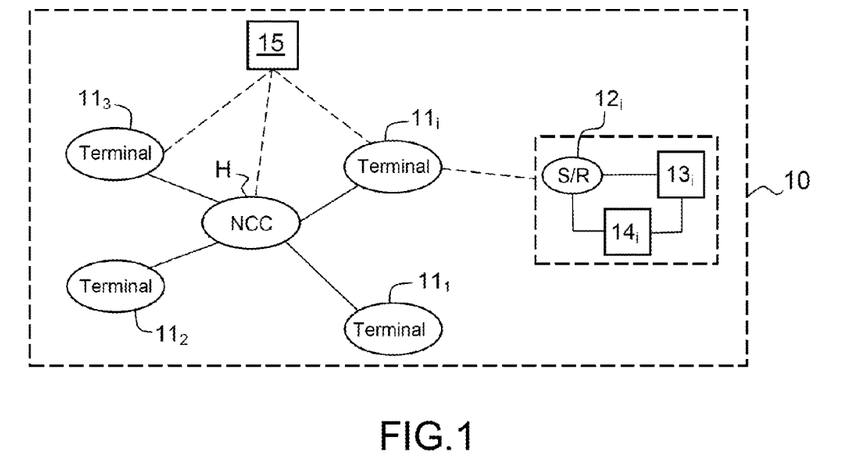

FIG. 1 illustrates an exemplary transmission network 10 in which the invention can be implemented. The network is, for example, of star topology with a centralized device or hub H and several terminals 11$i$ comprising sending/reception means 12$i$, means of satellite communication in the X/Ka bands, 14$i$, for example. At an instant t each terminal 11$i$ uses to satisfy its services a portion $B_i$ of the transmission passband B of the transmission network to transmit a bitrate $Q(D_i)$ of data $D_i$. This bitrate is associated with a spectral effectiveness $\eta_i$ with $\eta_i = D_i/B_i$. One of the objectives of the method according to the invention is to optimize the use of the passband B by maximizing the overall spectral effectiveness $\eta = (\Sigma D_i/B_i)$, of all the stations, at each instant, doing so in order to be able to maximize the services allocated to the set of terminals. In parallel with this optimization, the method allows protection of the data against interference. The method can also be applied to meshed networks for satellite transmission.

The hub H comprises a central controller or NCC whose function is notably to manage the allocation of the bands $B_i$, as a function in particular of the needs of the terminals which express them in the form of requests transmitted to the hub.

A terminal $11i$ comprises, for example, a module $13i$ adapted to measure the quality of the signals received so as in particular to adapt the coding, the modulation.

Figure 3:
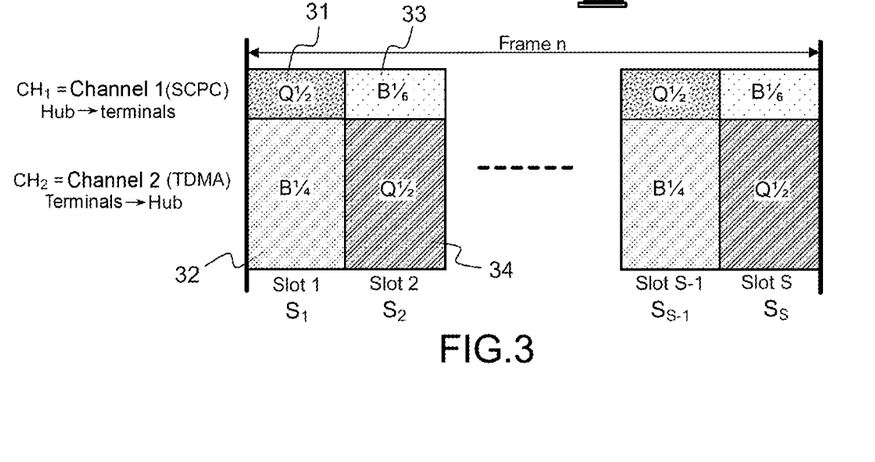

The transmission network is associated with a synchronization system 15 allowing in particular synchronization when sending and/or when receiving between the various terminals or between a terminal and the central controller NCC. The network uses the communication services provided by a communication satellite 20 (FIG. 3).

The method according to the invention is also applicable to the field of terrestrial transmissions the communication means $14i$ being able to be a satellite transmission or terrestrial link based support.

In particular, the method according to the invention implements mechanisms making it possible to achieve in a dynamic manner the appropriate fit between the service channels and the data transmission channels when the system is operational.

For the transmission channels, the method uses:
a transmission band B of width BHz,
P transmission channels in the transmission band B. The number of transmission channels is less than or equal to the number of senders. P is variable over time as a function of the number of senders present in the transmission network.

At a given instant t, the system comprises:
$P_{TMDA}$ so-called TDMA transmission channels
a TDMA channel is shared by several senders,
$P_{SCPC}$ so-called SCPC service channels
an SCPC channel is allotted to a single sender for the duration $T_{frame}$ of a frame,
$P_{TDMA} P_{SCPC}=P$
as per the number of transmission channels P, the number of channels $P_{TDMA}$ and the number of channels $P_{SCPC}$ are variable over time.

The channels are synchronous, that is to say that the signals that they transport all arrive at the hub or at the satellite in the case of satellite transmissions at the same instant.

The method will execute, for example the following steps:
determine the number of 4D-TDMA carriers as a function of the number and of the needs of the terminals,
determine the type of carriers (TDMA or SCPC) and the frequency band Bi of each of the 4D-TDMA carriers as a function of the terminals transmitting on these carriers, for each frame, by sharing the transmission band B among $P_{TDMA}$ multi-user transmission channels and among $P_{SCPC}$ single-user transmission channels, each channel consisting of frames comprising several slots, respectively $S_{TDMA}$ slots, $S_{SCPC}$ slots, each frame $T_n$ having a frame duration $T_{Frame}$, which is independent of the channel type, the adaptation of the number of channels being carried out at the frame rate $T_{Frame}$,
allocate in a dynamic manner several slots of a 4D-TDMA carrier as a function of the services requested by each terminal,
configure the coding/modulation scheme for each slot while taking account of the quality of the signals received.

As a function of the service channels required by the user, the algorithm implemented determines whether it is more relevant to allocate him an SCPC transmission channel (not shared temporally with other users) or a TDMA transmission channel (therefore shared between several users). This choice is made at the frame rate.

A transmission channel (TDMA or SCPC),
is sent by a carrier in a frequency band $B_{i\ (i=1\ \ldots\ P)}$, with the sum of the bands Bi used by the P channels being less than the transmission band B, $\Sigma B_i \leq B$. Equality is preferable in terms of optimization, but this depends on the granularity of the carriers used to transport the channels.

consists of frames of duration $T_{frame}$ which is independent of the channel type:
a TDMA frame consists of $S_{TDMA}$ slots,
an SCPC frame consists of $S_{SCPC}$ slots.

The number of slots $S_{TDMA}$ of a TDMA channel may be different from the number of slots $S_{SCPC}$ of an SCPC channel. In order to simplify the disclosure of the method according to the invention, the assumption $S_{TDMA}=S_{SCPC}$ will be employed in the subsequent description.

A slot consists of N periods, transmission intervals of duration $T_p$ sent at a frequency $F_{period}$ ($N_{TDMA}$ or $N_{SCPC}$ periods according to the channel type).

The frequency $F_{period}$ is not constant over the whole of the slot and can change at each new period i.e. every $T_p$ seconds.

FIG. 3 illustrates an exemplary time/frequency structure of three channels for a frame without frequency hop, in the case of a system comprising two terminals $11_1$, $11_2$, the hub H and the communication satellite 20.

For the duration $T_{frame}$ of a frame, the number of transmission channels P and the associated carriers do not change (the channel type—SCPC or TDMA—and the occupied band of each of the carriers are invariant on the scale of the frame). The adaptation of the number of transmission channels, of their associated carrier is done at the frame rate every $T_{frame}$ seconds. Typically the frame rate is of the order of a second.

Figure 2:
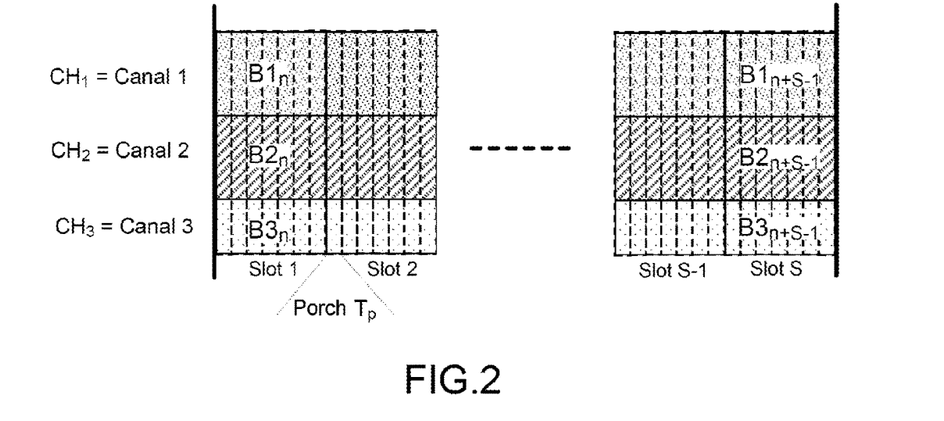

In FIG. 2, to a first channel 1, $CH_1$, is allocated the band $B1_n, \ldots, B1_{n+S-1}$; to the second channel 2, $CH_2$, the band $B2_n, \ldots, B2_{n+S-1}$, to the third channel 3, $CH_3$, the band $B3_n, \ldots, B3_{n+S-1}$, doing so on the S slots, $S_1, \ldots S_{S-1}, S_S$, of the frame n.

The objective of a terminal is notably to be able to ensure a certain number of services to its users, such as videoconferencing, Voice over IP or VoIP, file transfers, etc. A terminal therefore needs service channels, the requests that the terminals transmit to the hub or the satellite in a satellite system using signalling.

The transmission system according to the invention defines at least two types of service channels, for constant bitrate CBR (Constant Bit Rate) service for services of VoIP, videoconferencing type, or variable bitrate or VBR (Variable Bit Rate) service channels for file transfers or "Best Effort" services.

In the given example, it is assumed that the system defines the following three service channels; a first VoIP CBR channel, a second CBR channel, for video, a third VBR channel for data over IP or "Best Effort" services.

The terminals of the network request service channels whilst the central controller NCC allocates transmission channels. These requests and allocation are done through the synchronization and signalling network intrinsically with the structure of the transmission channels.

This synchronization and signalling network is starred around the NCC; it consists of a point-to-multipoint broadcasting link from the NCC to the set of terminals and from a set of terminal point-to-point links to NCC.

The NCC must be able to indicate to the set of terminals:
The TDMA Channels
The Number of carriers
For each carrier
    The Band allocated to the carrier
    For each slot of each carrier
        The slot Type
            CBR VoIP
            CBR Video
            VBR
            Silence→this type of slot is used for ½ duplex applications for example,
        The coding and modulation Scheme (ModCod) for each slot, other than silence slot
        The sender terminal for the slot
The SCPC Channels
The Number of carriers
For each carrier
    The Band allocated to the carrier
    The Sender Station or sender terminal for the carrier
    The coding and modulation Scheme (ModCod) for each slot
        As a function of the band and of the ModCod, the binary bitrate is deduced therefrom.

Each station or terminal must be able to indicate to the NCC through the aforementioned synchronization network:
The services requested:
VBR Channel
    The Bitrate to be transmitted, periodic bitrate of BFT type or FTP bitrate
CBR Channel
    VoIP
CBR Channel
    Video
The quality of the reception of the slots that it receives (C/No)
    This information is used for the implementation of rain mitigation technique like ACM, and determined according to procedures known to the person skilled in the art.

To achieve the appropriate fit between the service channels and the transmission channels, the method according to the invention will execute various steps, a few examples of implementation of which are explained hereinafter.

The transmission channels are not pre-allocated to the terminals. The allocation of the transmission channels, carrier and slot, is done dynamically as a function of the services requested not the terminals.

Within one and the same SCPC or TDMA carrier, each slot is transmitted with the modulation/coding scheme adapted so that the terminal receiving the slot can receive it without error, according to a principle known to the person skilled in the art. The NCC will for example dynamically adapt the coding rate of the error-correcting code and the order of the modulation used as a function of the quality of the received signal. It may be assumed that the link budget will make it possible to maintain the synchronization between two remote terminals or between a terminal and the NCC. The coding/decoding mechanism is intrinsic to the waveform. The synchronization and management network starred around the NCC contains the signalling necessary for the dynamic adaptation of the waveform profiles for each terminal. As regards the broadcasting link from the NCC to the terminals, the NCC must be able to transmit data to the most distant terminal, the least favoured as regards the link budget. For each carrier, of SCPC or TDMA type, the adaptation of the coding/modulation pair, ModCod, is done slot by slot independently of one another at the slot rate $T_{Slot}$. FIG. 3 illustrates this step. For the first slot 1, $S_1$, of the frame n, the NCC allocates the channel 1, $CH_1$ SCPC hub towards the terminals and a Q ½ modulation, 31. For the same slot $S_1$, there is allocation of the second channel 2, $CH_2$ TDMA, for the data exchanges between one of the terminals and the hub, with a B ¼ modulation, 32. At the following second slot 2, $S_2$, the Modcod has changed and becomes, 33, B ⅙ for the first channel $CH_1$, and 34 Q ½ for the second channel 2, $CH_2$. At the slots of odd order, there will be for example the modulation chosen for the first slot 1, $S_1$ and for the slots of even order, a modulation corresponding to the modulation of the second slot 2 $S_2$.

Figure 4:
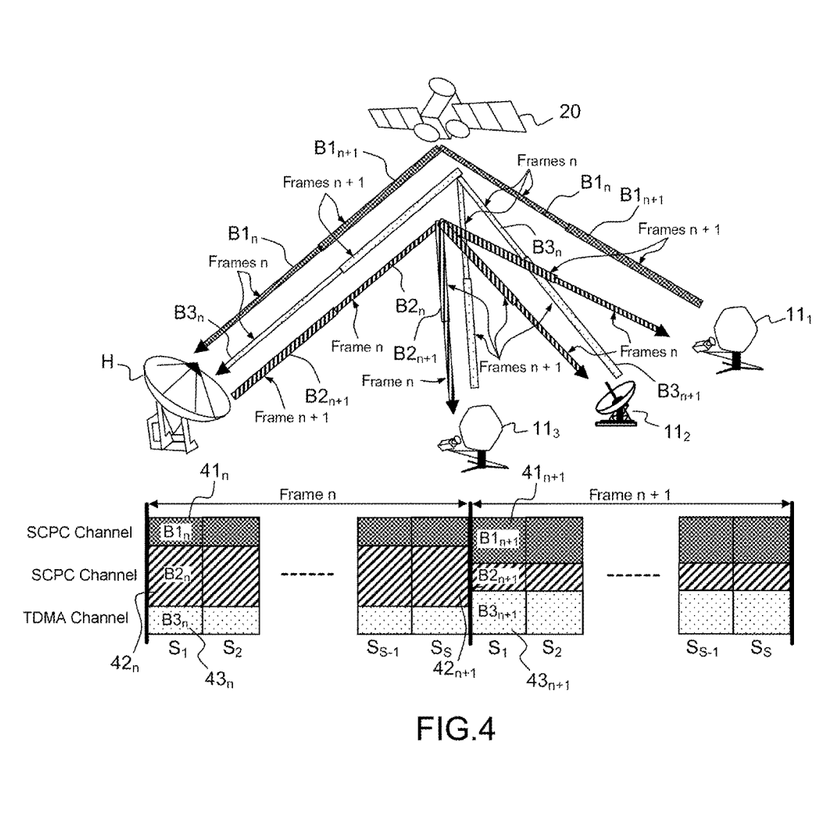

At each frame, as a function of the needs of the set of terminals, the transmission band B is shared dynamically. This sharing is done between the SCPC channels and the TDMA channels. There is no band specific to the SCPC channels and specific to the TDMA channels. The allocation of the band allocated for each SCPC or TDMA channel is done channel by channel independently of one another, at the frame rate $T_{frame}$, on condition that the total band B is not exceeded. FIG. 4 gives an example of this allocation. For the frame $T_n$, for a first SCPC channel, the method allocates $41_n$ a first sub-band $B1_n$, for a second SCPC channel, it allocates $42_n$ a second sub-band $B2_n$, and then for the TDMA channel, it allocates $43_n$ a third sub-band $B3_n$. For the following frame $T_{n+1}$, the allocation of the bands can be different, the band $B1_{n+1}$ has been allocated to the first SCPC channel, $41_{n+1}$, the band $B2_{n+1}$ for the second SCPC channel, $42_{n+1}$, the band $B3_{n+1}$ for the TDMA channel, $43_{n+1}$.

Figure 5:
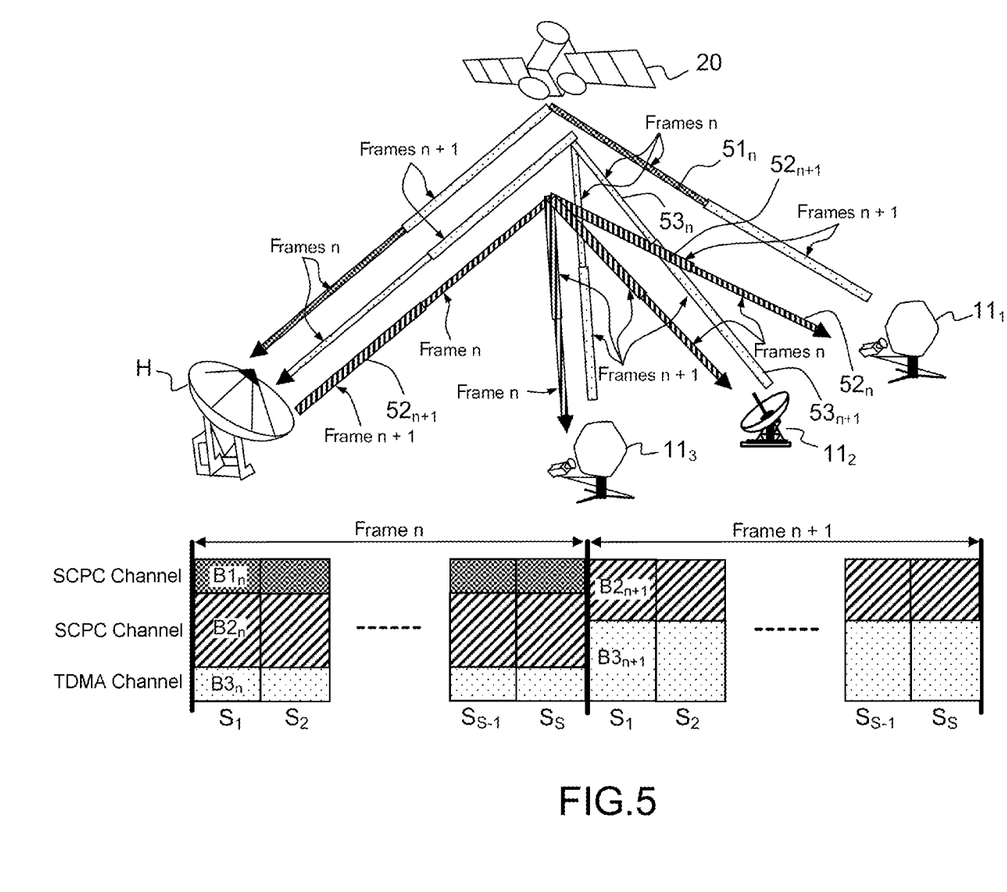

At each frame, as a function of the needs of the set of terminals and/or of the number of terminals present in the network, the number of TDMA, SCPC carriers is recalculated. In the example of FIG. 5, a terminal $11_1$ uses up to the frame Tn, a first SCPC channel, 51 and a band allocated to this channel, to transmit for example a file. Once the transmission of this file has terminated, the terminal needing only a minimum, or "Best Effort", service, the band $B1_n$ allocated to this SCPC channel, $51_n$, is released and redistributed to the other SCPC and TDMA channels, at the level of the frame n+1, a band $B2_{n+1}$ has been allocated $52_{n+1}$ to the second SCPC channel and a band $B3_{n+1}$, with B= $B2_{n+1}+B3_{n+1}$, has been allocated to the TDMA channel $53_{n+1}$. The station $11_1$ then uses the TDMA channel, 43, to transmit data if need be. The number of SCPC and TDMA carriers is adapted at the frame rate.

The SCPC and TDMA carriers as a whole are synchronous. In the case where the SCPC and TDMA carriers consist of periods of the same duration Tp, the method can implement an orthogonal frequency hop law, i.e., all the channels change in a synchronous manner the central frequency Fc of their carrier. The period hop is orthogonal since the central frequency of each carrier is calculated in such a way that two carriers do not overlap frequentially. This makes it possible advantageously to afford protection at the communications level.

For example, at each period, the frequential order of the channels is drawn randomly:
    C1 (carrier of width B1)
    C2 (carrier of width B2)
    C3 (carrier of width B3)
    For the period n: the order is C3, C1 and C2.
    With respect to the transmission band lying between $F_{min}$ and $F_{max}$ (B=$F_{max}-F_{min}$), the central frequency of the carrier of the channel is:
    C3: $F_{min}+B3/2$
    C1: $F_{min}+B3+B1/2$ C2: $F_{min}$+B3+B1+B2/2 with B=B1+B2+B3.

Figure 6:
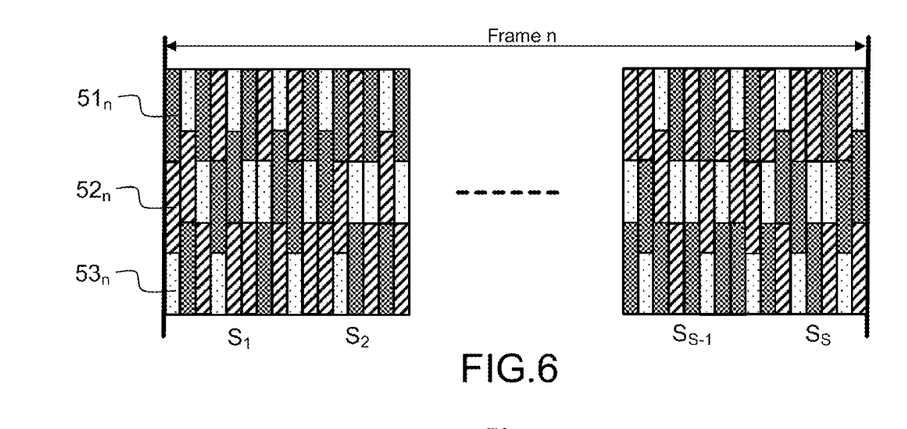

In the case where the period time $T_{pTDMA}$ of the TDMA carriers is equal to the period time $T_{pSCPC}$ of the SCPC carriers, the orthogonal frequency hop is executed in a single stage. FIG. 6 illustrates the orthogonal frequency hop of the SCPC and TDMA channels at the period rate, for the channels represented in FIG. 4, for example.

Figure 7:
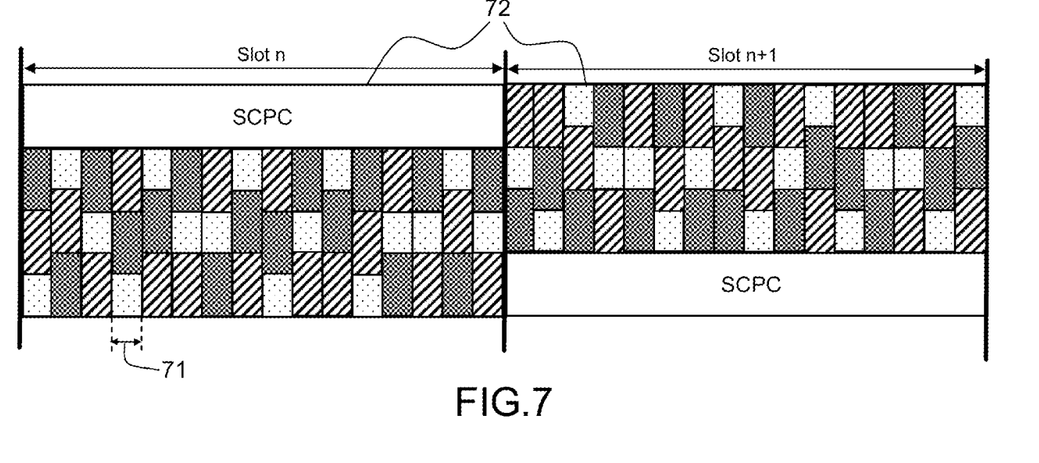

FIG. 7 illustrates another example for the case where the period time $T_{pTDMA}$ of the TDMA carriers is different from the period time $T_{pSCPC}$ of the SCPC carriers, the frequency hop then being made in two stages:

a frequency hop of the periods of one and the same channel type at the period rate, 71, a frequency hop of the bands allocated to the SCPC channels and TDMA channels at the slot rate, 72.

According to a variant embodiment, the method can pre-plan carriers at the NCC level so as to facilitate the appropriate fit between the service channel requests by the terminals and by the transmission channels.

The example which follows is given within the framework of an application of the method and illustrates in particular its implementation in a system comprising several users belonging to a communications group (the friends) and a central device. A BFT (Blue Force Tracking) device makes it possible to ascertain the location of the various parties of the communication group in a given geographical zone. This device displays the location of the parties of the group on a cartographic or satellite background offering the various users of the system excellent vision of a given zone. In the same manner, the tracking of other parties who do not form part of the same communication group is denoted, for example, RFT (Red Force Tracking).

In the given example, we have:

a network of several tens of users four VoIP Channels max, for example,

VBR (Best Effort) Channels for BFT or data.

For the BFT device, the aim is to propose a service of SMS type (a hundred or so characters dispatched during a single slot). The periodicity of the BFT messages per user is several seconds. The VoIP service channels are allocated on demand (about 8 kbps per channel).

Figure 8:
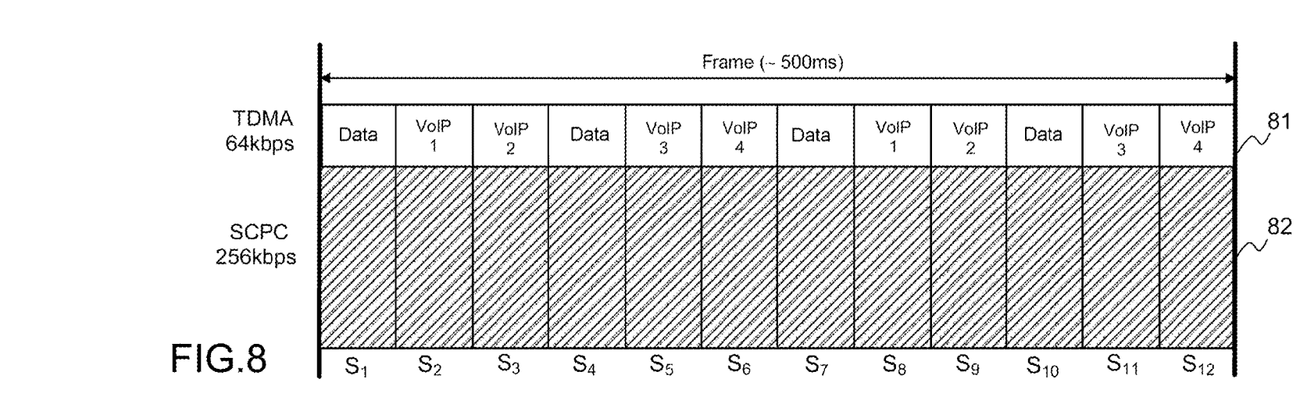

This implementation is illustrated by FIG. 8. The Hub transmits on an SCPC transmission channel, 82. The SCPC slots are not tagged since this allows the lone sender terminal to manage its own QoS locally.

The user terminals, FIG. 8, transmit on the TDMA transmission channel, 81. The unallocated CBR (VoIP) slots are reserved for the transmission of data for the duration of the frame (VBR slots). These "VBR" slots are distributed to the terminals according to an algorithm of Round Robin type, for example.

The system and method described above apply without departing from the scope of the invention for terrestrial transmission systems working in half-duplex.

Figure 9:
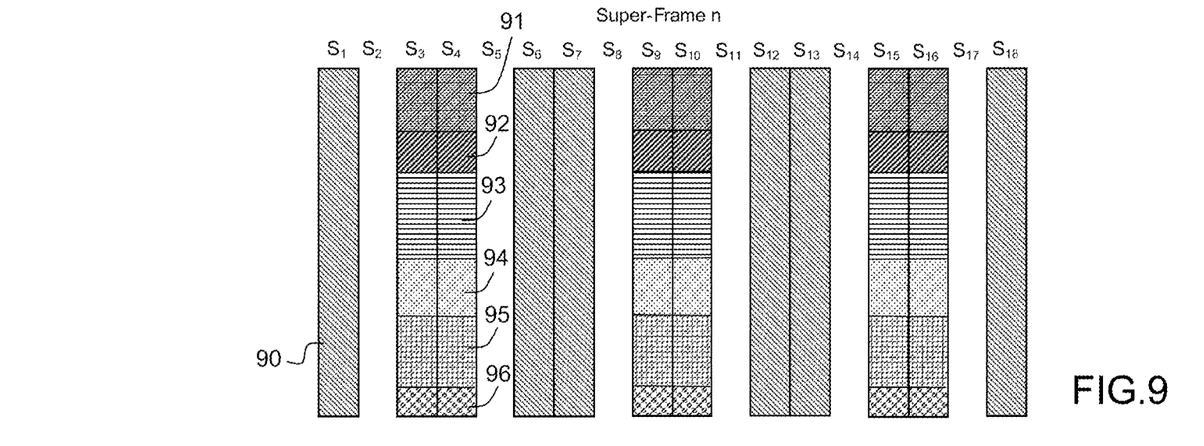

This is illustrated by FIG. 9 in the case where the agility of the half-duplex terminal does not make it possible to perform an immediate alternation from receive to send; the time-frequency structure represented corresponds to a network comprising an NCC and 6 stations or terminals. The implementation is based on the use of 7 TDMA channels with management of the half-duplex character of the terminals by the insertion of silence slots allowing Hub send/terminals send alternation. Thus, the first slot $S_1$ is reserved for the NCC with a carrier 90, the second slot $S_2$ is a silence slot, slots $S_3$ and $S_4$ are reserved for the six stations with six carriers, 91, 92, 93, 94, 95, 96.

According to this embodiment, the transmission band B is totally used by the hub on its send slots and it is shared between the various user terminals as is described previously on the send slots of these terminals.

According to another embodiment, the method according to the invention can be implemented within a STANAG 4606 application, known to the technical field, for example for PIM/Phone services.

The invention claimed is:

1. A method of multiuser transmission in a network comprising at least one central control station NCC (Network Control Center) and one or more terminals, using a transmission band B, P transmission channels in the transmission band B, the method comprising at least the following steps:

determining a number of 4D-TDMA (Time Division Multiple Access) carriers as a function of a number and needs of the one or more terminals, the number of TDMA or SCPC (Single Channel Per Carrier) carriers depending in real time on services and the number of the one or more terminals, determining a type of TDMA or SCPC carriers and a frequency band Bi of each of the 4D-TDMA carriers as a function of the one or more terminals transmitting on the TDMA or SCPC carriers, for each frame, by sharing the transmission band B among $P_{TDMA}$ multiuser transmission channels and among $P_{SCPC}$ single-user transmission channels, each transmission channel consisting of frames Tn comprising several slots, $S_{TDMA}$ Slots, $S_{SCPC}$ slots, each frame $T_n$ having a frame duration $T_{Frame}$, which is independent of a channel type, and an adaptation of a number of channels being carried out at a frame rate $T_{Frame}$, allocating in a dynamic manner several slots of a 4D-TDMA carrier as a function of respective services requested by each terminal, and configuring a coding/modulation scheme for each of the slots while taking account of a quality of signals received, wherein:

the at least one central control station NCC indicates to a set of terminals:

TDMA Channels, the number of carriers, and for each carrier parameters relating to an allocated band, a type of slot and a coding and modulation Scheme (ModCod) for each slot, and a sender terminal for the respective slot, SCPC Channels, the number of carriers, and for each carrier an allocated band, a sender station, and a coding and modulation Scheme (ModCod) for each slot, wherein each terminal of the set of terminals indicates to the at least one central control station NCC, services requested and a quality C/No of reception of slots received.

2. The method according to claim 1, wherein a TDMA transmission channel or an SCPC channel is sent on a carrier in a transmission band Bi while verifying that a sum of frequency bands ΣBi used is less than a transmission bandwidth B, a channel consists of several frames $T_n$ each having a frame duration $T_{Frame}$, which is independent of a channel type, an adaptation of a number of channels being carried out at a frame rate $T_{Frame}$, the carrier and type of time slices being defined as a function of respective service or services requested by the one or more terminals.

3. The method according to claim 2, wherein in a case where a terminal needs a minimum service, a band allocated to a channel of the terminal is released and the band is distributed to other SCPC and TDMA transmission channels.

4. The method according to claim 1, wherein in a case of synchronous carriers, an orthogonal frequency hop is used, with channels changing in a synchronous manner with a central frequency Fc of a respective carrier.

5. The method according to claim 4, wherein when a period time $T_{pTDMA}$ of the TDMA carriers is equal to a period time $T_{pSCPC}$ of the SCPC carriers, the orthogonal frequency hop is executed while using a single timing rate.

6. The method according to claim 4, wherein when a period time $T_{pTDMA}$ of the TDMA carriers is different from a period time $T_{pSCPC}$ of the SCPC carriers, the orthogonal frequency hop is carried out in two stages:
   a first frequency hop of periods of one and a same channel type at a period rate, and
   a frequency hop of bands allocated to the SCPC channels and the TDMA channels at a time slice rate.

7. The method according to claim 1, comprising implementing several Voice over IP (VoIP) constant bitrate CBR service channels, several service variable bitrate VBR channels for transmission of files or data, and in that unallocated Voice over IP (VoIP) slots are tagged as data for a duration of a frame, unused VoIP slots are put back into a set of "best effort" resources, and slots dedicated to the data are distributed to the one or more terminals according to an algorithm of Round Robin type.

8. The method according to claim 1, wherein:
   the slot types for TDMA carriers include CBR VoIP, CBR Video, VBR, and Silence, where this type of slot is used for half duplex applications;
   for TDMA carriers, the coding and modulation Scheme (ModCod) is indicated for each slot other than a silence slot;
   for the SCPC carriers, a binary bitrate is deduced as a function of the allocated band and the ModCod; and
   the services requested indicated by each terminal of the set of terminals comprise at least one of
   VBR Channel: —a Bitrate to be transmitted, periodic bitrate of BFT type or FTP bitrate; CBR Channel: VoIP; and CBR Channel: Video.

9. A 4D-TDMA multiuser transmission system, comprising at least one controller device NCC in conjunction with several terminals, the at least one controller device NCC being adapted to execute the steps of the method according to claim 1.

10. The multiuser transmission system according to claim 9, wherein the at least one controller device NCC and the several terminals operate in half-duplex.

* * * * *